(12) United States Patent
Proffitt et al.

(10) Patent No.: US 6,254,009 B1
(45) Date of Patent: Jul. 3, 2001

(54) COMMUNICATING THERMOSTAT

(75) Inventors: Jerry L. Proffitt, Wabash; Michael A. Roher, Fort Wayne, both of IN (US); Laurie L. Werbowsky, Jamesville; Peter G. Pierret, Fayetteville, both of NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/456,355

(22) Filed: Dec. 8, 1999

(51) Int. Cl.[7] ............................... G05D 23/00; F24F 3/00
(52) U.S. Cl. .......................... 236/47; 236/51; 165/209
(58) Field of Search .............................. 236/51, 47, 94; 165/209

(56) References Cited

U.S. PATENT DOCUMENTS

| 4,401,262 | * | 8/1983 | Adams et al. ................. 236/47 X |
| 5,197,668 | | 3/1993 | Ratz et al. ................. 236/51 |
| 5,318,224 | * | 6/1994 | Darby et al. ................. 236/47 |
| 5,361,982 | * | 11/1994 | Liebl et al. ................. 236/47 X |
| 5,926,776 | | 7/1999 | Glorioso et al. ................. 702/130 |

* cited by examiner

Primary Examiner—William Wayner

(57) ABSTRACT

A thermostat receives setpoint information from a system in communication with the thermostat. The thermostat is operative to modify any locally entered setpoints by a predefined amount dictated by the setpoint information received from the system in communication with the thermostat. The thermostat is preferably operative to continually display the time remaining during which it will be under the control of the system in communication with the thermostat. This affords an occupant of the room viewing the displayed time with an opportunity to elect to either continue or to override the control by the system in communication with the thermostat at any time.

10 Claims, 4 Drawing Sheets

COMMUNICATING THERMOSTAT

BACKGROUND OF THE INVENTION

The present invention relates to thermostats and, in particular, to thermostats having the capability of receiving and transmitting information to other control devices.

Thermostats have heretofore transmitted and received information from other control devices as is exemplified by the thermostat of U.S. Pat. No. 5,197,668. Such thermostats have moreover been used to communicate with an energy provider for the purpose of implementing a cost-effective control of a heating, ventilating and air conditioning system. Such a thermostat is illustrated in U.S. Pat. No. 5,926,776. The thermostat in U.S. Pat. No. 5,926,776 may receive information from the energy provider requesting that one or more setpoints locally entered into the thermostat be replaced with temperature setpoints by the energy provider. U.S. Pat. No. 5,926,776 moreover discloses that the information provided by the energy provider may also include times when the setpoints will be in effect. The thermostat is moreover capable of displaying the aforementioned information so as to afford an occupant of the room in which the thermostat has been placed an opportunity to override the energy provider's setpoints. In the event that an override is not elected, the thermostat substitutes the energy provider's setpoints for the locally entered setpoints.

The above described thermostat requires a total surrendering of the preferred locally entered setpoints in favor of the energy provider's setpoints in the event that an override is not elected. The occupant of the room is not afforded an opportunity to proceed forward with his or her locally entered setpoints subject only to an energy saving modification thereto.

SUMMARY OF THE INVENTION

It is an object of the invention to provide a two-way communicating thermostat with the capability of implementing a setpoint control requested by a system in communication with the thermostat without completely relinquishing local control of determining operating setpoints at the thermostat.

It is another object of the invention to provide a two-way thermostat with the capability of allowing a person to at any time override the setpoint control dictated by the system in communication with the thermostat.

The above and other objects are achieved by a two-way communicating thermostat having a transceiver associated therewith for receiving information from a system in communication with the thermostat. The thermostat is operative to display certain of the received information when it is under the control of the system in communication with the thermostat. The thermostat is preferably operative to modify any locally entered setpoints by a predefined amount dictated by the system in communication with the thermostat. In this manner, there is a continued modification of locally entered setpoint information when determining the operating setpoint of the thermostat while under the setpoint control dictated by the system in communication with the thermostat.

The thermostat furthermore is preferably operative to continually display the time remaining during which it will be under the control of the system in communication with the thermostat. This affords an occupant of the room viewing the displayed time with an opportunity to elect to either continue or to override the control of the system in communication with the thermostat at any time. In the event that the occupant elects an override, the thermostat immediately exits from the setpoint control dictated by the system in communication with the thermostat and resumes local setpoint control as defined by local entries of setpoint information to the thermostat.

The thermostat preferably remains in an override status once an override has been elected until such time as a reset is internally authorized within the thermostat in accordance with a schedule of times for such resetting. The thermostat continues to override any further requests to control setpoints by the system in communication with the thermostat until such internal resetting of the override occurs.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
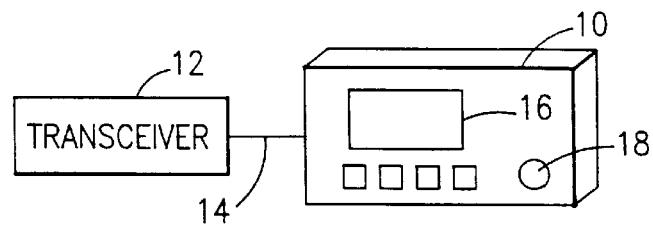
FIG. 1 is a block diagram of a two-way communicating thermostat of the present invention.

Referring to FIG. 1, a thermostat 10 is operatively connected to a transceiver 12 via a communication line 14 so as to receive or transmit information to the transceiver 12. The thermostat 10 includes a display 16, which is preferably a liquid crystal display as well as a plurality of touch sensitive buttons. These touch sensitive buttons include a touch sensitive button 18 that can be depressed at any time by one viewing the display 16. In particular, the touch sensitive button 18 may be depressed when one wishes to override a mode of operation indicated on the display 16. The transceiver 12 provides a communication link between the thermostat 10 and a hierarchical control system providing specific setpoint control information to the thermostat 10. The hierarchical control system is preferably under the control of an energy provider seeking to provide cost-effective setpoint control information to the thermostat 10.

Figure 2:
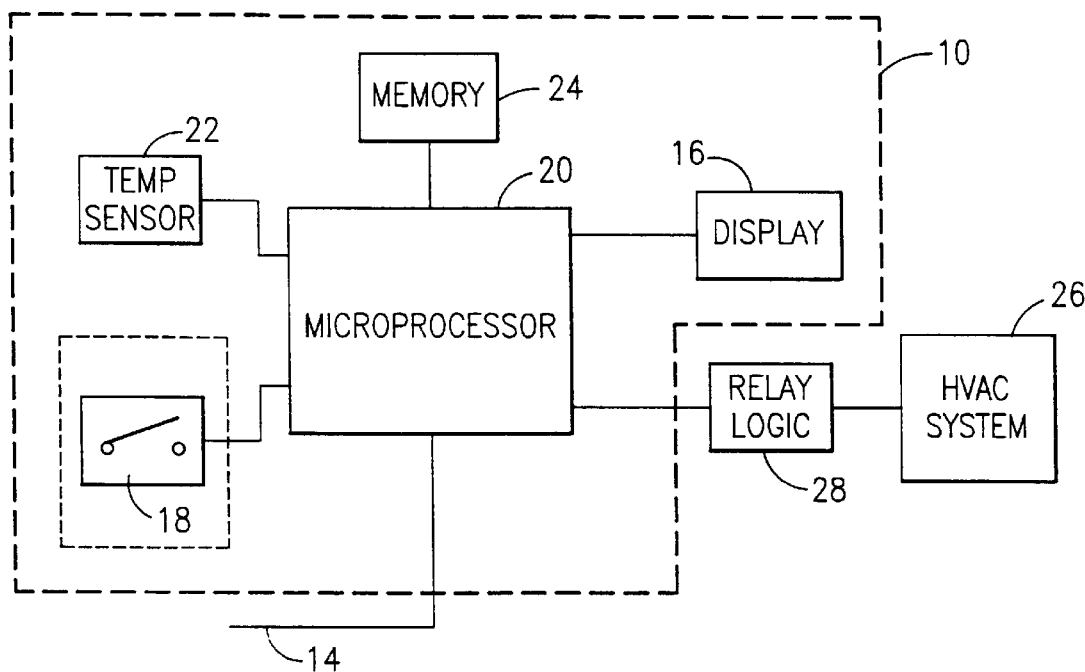
FIG. 2 is a block diagram of a microprocessor connected to both a display and a selected button switch within the thermostat of FIG. 1.

Referring to FIG. 2, the touch sensitive button 18 is illustrated as a switch connected to a microprocessor 20, which is in turn connected to the display 16. The microprocessor 20 is also connected to a temperature sensor 22 and to a memory 24. The microprocessor normally executes one or more control programs stored in memory 24 which monitor any variation of the temperature indicated by the sensor 22 with respect to one or more locally entered setpoints preferably stored in the memory 24. These control programs cause the microprocessor to control an HVAC system 26 through relay logic 28 so as to thereby heat or cool, when necessary, the space in which the thermostat is located.

The microprocessor 20 also executes a program stored in the memory 24 which processes information received from the transceiver 12 via the line 14. This latter program, when executed by the microprocessor, will cause certain modifications to be made to the locally entered setpoints that have also preferably been stored in the memory 24. The program will also cause the microprocessor to execute the one or more programs stored in memory which control the HVAC system 26. These control programs will now however monitor any variation of the temperature indicated by the temperature sensor with respect to the locally setpoints as modified. The program will also preferably cause the microprocessor to display certain information on the display 16 that has been received from the transceiver 12 via line 14. The displayed information will include an indication as to the time remaining during which the locally entered setpoints are to be subject to the aforementioned modifications.

Figure 3A:
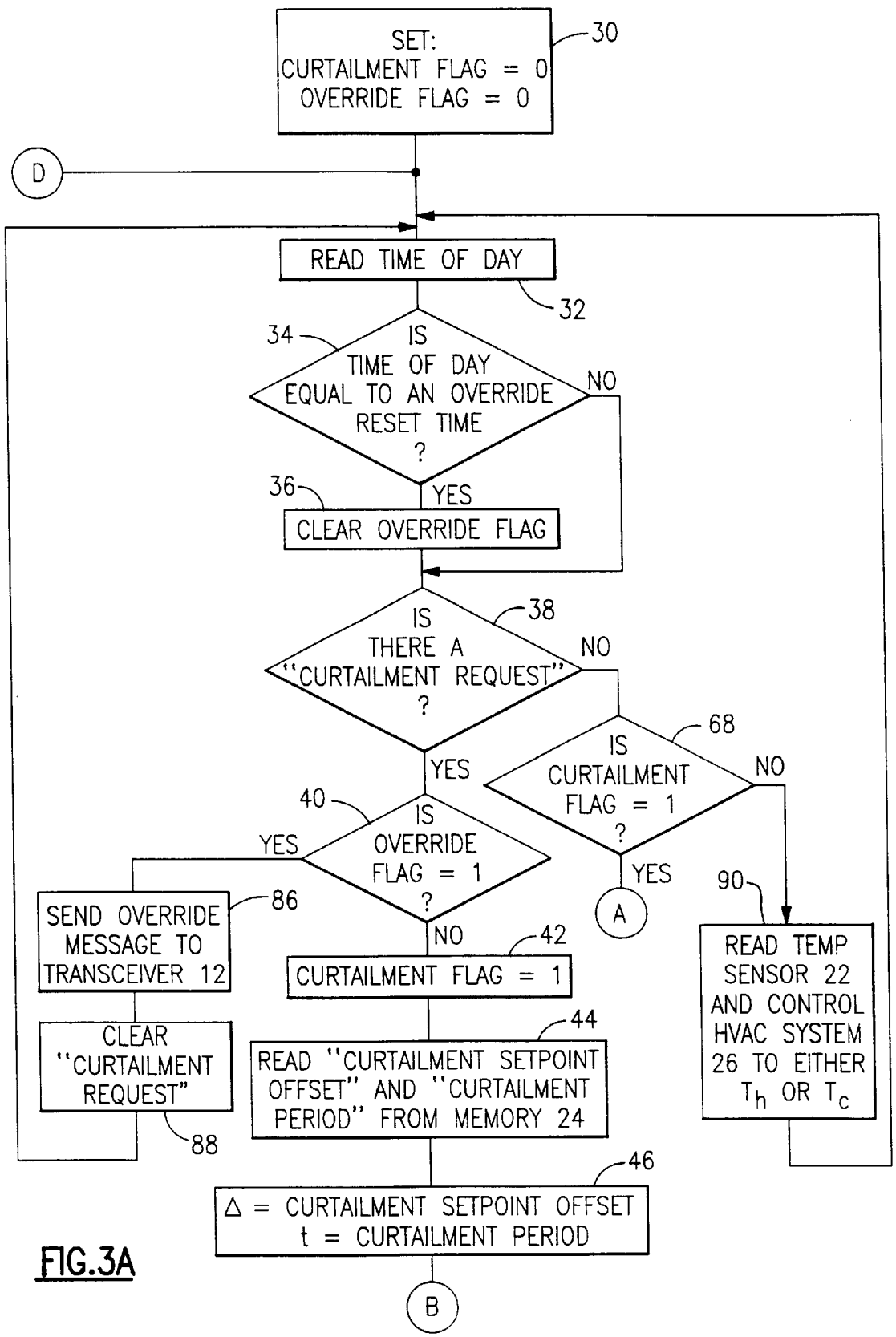
FIG. 3 is a flow chart of the process implemented by the processor of FIG. 2 so as to respond to any external control dictated by a communication to the thermostat of FIG. 1.
Figure 3B:
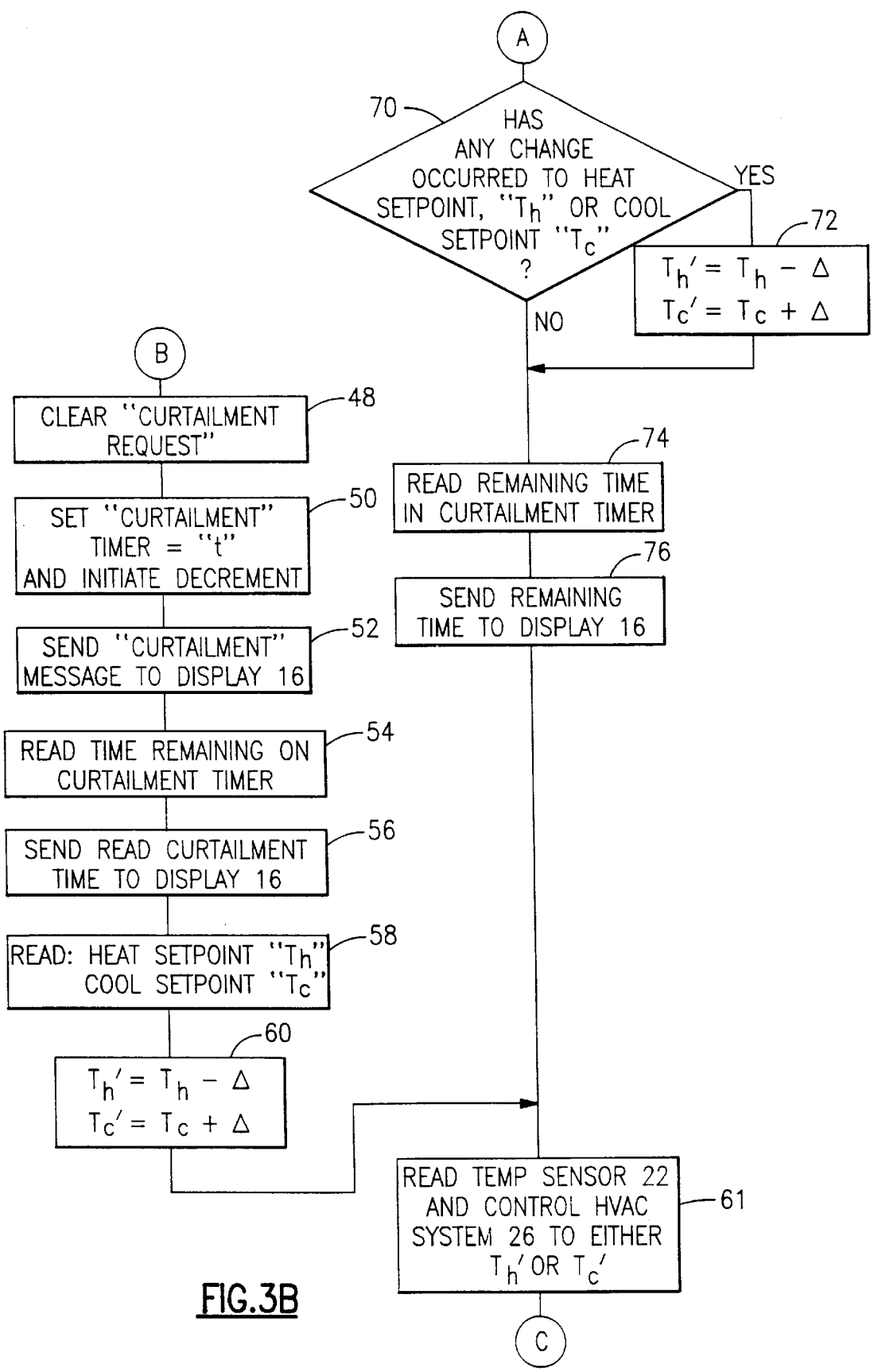
Figure 3C:
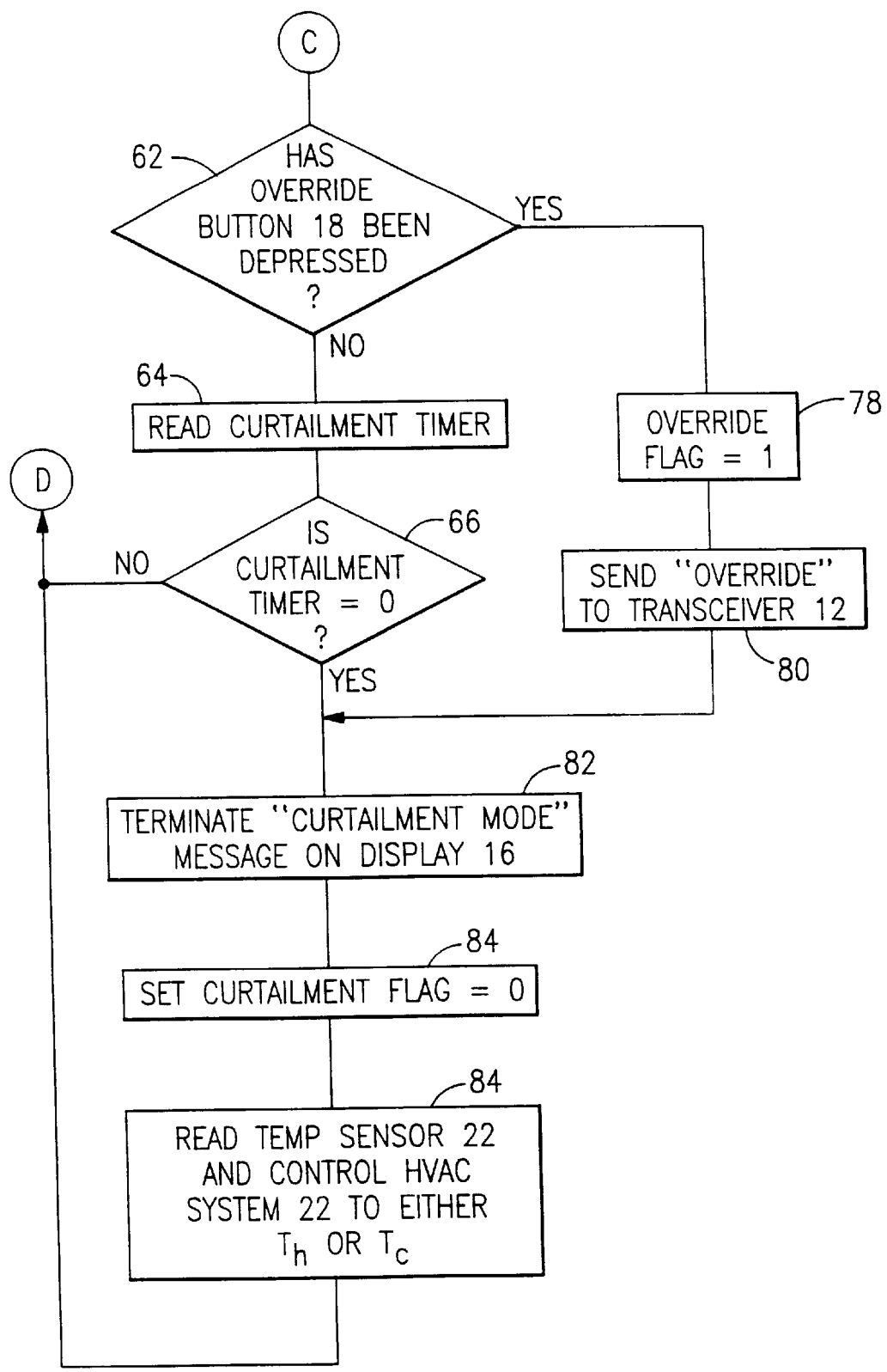

Referring to FIG. 3, a flow chart of the executable steps of the aforementioned program executed by the microprocessor 20 in response to receipt of information received from the transceiver over the line 14 is illustrated. The flow chart begins with a step 30 wherein a "Curtailment flag" is set equal to zero and an "Override flag" is also set equal to zero. The microprocessor proceeds from step 30 to a step 32 and reads the time of day. It is to be appreciated that the time of day is preferably provided by an internal clock within the microprocessor. An inquiry is next made in a step 34 as to whether the read time of day is equal to an override reset time. This is preferably accomplished by reviewing a table of reset times stored in memory 24 to determine whether the read time of day is within a predefined range of any of the stored reset times. The predefined range is preferably set so that a read time of day does not need to be exactly equal to a reset time. This allows for any delay in executing step 34 relative to the override reset times set forth in the table.

In the event that the time of day, as read from the internal clock, is equal to an override reset time in accordance with the review of tabulated override reset times, then the processor proceeds to a step 36 and clears the Override flag. It is to be appreciated that the processor will normally not encounter an override reset time in step 34. In such instances, it will proceed directly along the no path out of step 36 to a step 38 rather than first clearing the Override flag in step 36. Referring to step 38, the processor 20 inquires whether a Curtailment Request has been received over the line 14. This request will normally be an encoded message indicating that a curtailment of the locally entered setpoints is being requested by the hierarchical control system. The microprocessor 20 will preferably have stored the request in memory 24 at time of receipt. The microprocessor will hence in step 38 access memory 24 to see whether a Curtailment Request has been stored. Assuming that a Curtailment Request is present in memory 24, the microprocessor would proceed from a step 38 along the yes path to a step 40 and inquire whether the Override flag has been set. Assuming that the Override flag is equal to zero, the microprocessor will proceed along the no path to a step 42 and set the Curtailment flag equal to one. The microprocessor next reads a Setpoint Offset and Curtailment Period from memory 24 in a step 44. It is to be appreciated that the Setpoint Offset and the Curtailment period will have been previously stored in memory 24 in response to having received a Curtailment Request on the line 14. The microprocessor will proceed from a step 44 to a step 46 and set the value of Setpoint Offset equal to "A" and the value of the Curtailment period equal to "t". The processor will proceed from step 46 to a step 48 and clear all information in memory 24 relating to the Curtailment Request. The processor will next proceed from step 48 to a step 50 and set a Curtailment Timer equal to "t" and initiate a decrementing of the timer. The processor will proceed in a step 52 to send a "Curtailment" message to display 16. The display 16 preferably switches from any currently displayed information to a format wherein a portion of the display will contain the words "CURTAILMENT MODE" or words equivalent thereto. This will allow anyone viewing the display to note that the thermostat 10 has transitioned from a complete local control of operating setpoint to a modified curtailment of locally entered setpoints as dictated by the hierarchical control system. The processor will proceed to a step 54 and read the current time remaining on the Curtailment Timer. The read time will be sent to the display 16 in a step 56. The processor will proceed to a step 58 and read a locally entered heat setpoint "$T_h$" and a locally entered cool setpoint "$T_c$". The heat setpoint "$T_h$" and the cool setpoint "$T_c$" are preferably stored in memory 24 as a result of the microprocessor having previously received values for both these setpoints entered locally to the thermostat. These particular setpoint values may for instance be the result of having previously locally programmed the microprocessor to implement various setpoints at various times of day before execution of the steps in FIG. 3 or these values could be entries made during the execution of these steps. The thus read setpoints will be modified by the Setpoint Offset, $\Delta$, in a step 60. Referring to step 60, the operative setpoint $T'_h$ will be equal to the read heat setpoint $T_h$ minus the value of $\Delta$. The operative cool setpoint $T'_c$ will be equal to the read cool setpoint $T_c$ plus the setpoint offset $\Delta$. It is hence to be appreciated that any particular locally defined heat and cool setpoints that are to be then used by the microprocessor 20 will be modified by the setpoint offset in step 60.

The microprocessor proceeds from step 60 to a step 61 and preferably executes a separate control program which reads the temperature sensor 22 and thereafter controls the HVAC system 26 so as to achieve either the operative heat setpoint $T'_h$, if the HVAC system is a heating device or the operative cool setpoint, $T'_c$, if the HVAC system is a cooling device. If the HVAC system is, for example, both a heating and cooling device, then the mode of operation will determine whether $T'_h$ or $T'_c$ is used.

The processor proceeds from step 61 to a step 62 and inquires whether the override button 18 has been depressed. Assuming that the override button has not been depressed in response to a user or occupant of the room reading the display 16, then the processor will proceed along a no path to again read the Curtailment Timer in a step 64. The processor will proceed in a step 66 to inquire whether the Curtailment Timer is equal to zero. As long as there is remaining time on the Curtailment Timer, the processor will proceed back to step 32 and again inquire as to the time of day. The processor will thereafter inquire as to whether or not a reset of an override condition needs to occur. Since an override condition is not in effect, the processor will inquire as to whether another Curtailment Request has been received in step 38. As long as another request has not been received the processor will proceed to a step 68 and inquire as to whether the Curtailment flag has been set equal to one. Since the Curtailment flag has been previously set equal to one in step 42, the processor will proceed from step 68 to a step 70 and inquire as to whether any change has occurred to either the locally entered heat setpoint "$T_h$" or the locally entered cool setpoint "$T_c$" between successive executions of the logic of FIG. 3. This is preferably accomplished by comparing the time of day read in step 32 with a set of user programmed setpoint change times in memory 24. If the read time is within a very small predefined range of a programmed setpoint change time, then the values of the new locally entered setpoints for the change time, are read and stored as $T_h$ and $T_c$.

The processor will proceed to a step 72 and modify the new locally entered setpoint $T_h$ by subtracting the setpoint offset Δ. The new cooling setpoint $T_c$ will also be modified by adding the setpoint offset Δ.

The processor will proceed either directly from step 70 or via step 72 to read the Curtailment Timer in a step 74. The read remaining time indicated by the Curtailment Timer will be sent to the display 16 in a step 76. It is hence to be appreciated that the display 16 will continue to display "CURTAILMENT MODE" as required by step 52 but with an updated remaining time as provided by the processor 20 each time steps 74 and 76 are executed. The processor will proceed to execute steps 61–64 following the display of remaining time, provided that the override button 18 has not been depressed.

The processor will note if the override button 18 is depressed at any time during the successive executions of steps 32–38 and 68–76 and step 61 before again encountering step 62. When this occurs, the processor will proceed along the yes path and set the Override flag equal to one in a step 78. The processor will furthermore send an override message to the transceiver 12 in a step 80. The processor will next terminate the "CURTAILMENT MODE" message on the display 16 and preferably display the time of day as dictated by the internal clock. The processor will proceed from step 82 to a step 84 and set the Curtailment flag equal to zero. The microprocessor proceeds from step 84 to a step 85 and preferably executes a separate control program which reads the temperature sensor 22 and thereafter controls the HVAC system 26 so as to achieve either the locally entered heat setpoint $T_h$, if the HVAC system is a heating device or the locally entered cool setpoint, $T_c$, if the HVAC system is a cooling device. If the HVAC system is for example both a heating and cooling device, then the mode of operation will determine whether $T_h$ or $T_c$ is used. The processor will next proceed back to step 32 and again read the time of day. The processor will then proceed to inquire as to whether the read time of day is equal to a reset time stored in memory 24 as has been previously discussed. As long as the current time of day is not within a predefined range of a reset time, then the processor will merely proceed to again inquire as to whether there is a Curtailment Request. In the event that the processor has received a further Curtailment Request via the line 14, then the processor will proceed along the yes path to step 40 to inquire as to whether the Override flag equals one. As long as the Override flag remains equal to one, the processor will proceed along the yes path out of step 40 to a step 86 and send an Override indication to the transceiver 12. The processor will proceed to clear the currently stored Curtailment Request in a step 88 before returning to step 32.

Referring to step 32, the time of day will be read each and every time the processor proceeds through the logic of FIG. 3. At some point in time, the read time of day will be within a permissible range of a reset time set forth in the table of reset times in memory 24. This will prompt the processor to proceed from step 34 to clear the Override flag in step 36, thereby setting the Override flag equal to zero again. The processor proceeds to step 38 to inquire whether a Curtailment Request has been received. If a Curtailment Request has not been received, the microprocessor will proceed along a no path to step 68 and inquire as to whether the Curtailment flag equals one indicating a curtailment mode. Since the Curtailment flag will have been previously set equal to zero, any time an override has occurred, the microprocessor will proceed along a no path out of step 68 to a step 90 which and preferably execute a separate control program which reads the temperature sensor 22 and thereafter controls the HVAC system 26 so as to achieve either the locally entered heat setpoint, $T_h$, if the HVAC system is a heating device or the locally entered cool setpoint, $T_c$, if the HVAC system is a cooling device. If the HVAC system is, for example, both a heating and cooling device, then the mode of operation will determine whether $T_h$ or $T_c$ is used. The microprocessor will next proceed back to step 32.

It is to be appreciated that the microprocessor will again implement steps 32–38, 68 and 90 until such time as another Curtailment Request has been received. When this occurs, the processor will again respond to the received Curtailment Request by entering a new curtailment mode of operation in steps 40–66. In this mainer, the processor will be able to again implement a curtailment of the present cool and heat setpoints subject, of course, to any depression again of the override button 18 being detected in step 62.

It is to be appreciated that a preferred embodiment of a process to be implemented by the microprocessor 20 has been disclosed. Alterations and modifications to the disclosed process may occur without departing from the scope of the invention. In particular, the processor 20 may for instance receive different curtailment offsets for heating and cooling. In this event, the adjustments to the current heating and cooling setpoints will be with respect to the particularly dictated offsets for each setpoint rather than the currently disclosed single offset of Δ. It is furthermore to be appreciated that the Curtailment Timer may be initially set up differently from being a decrementing timer. For instance, a timer that merely counts upwardly from the time of initiation with an appropriate inquiry being made as to whether the thus incremented timer exceeds the Curtailment period of time would work equally well. Accordingly, the foregoing description of a preferred embodiment is by way of example only and the invention is to be limited only by the following claims and equivalents thereto.

What is claimed is:

1. A process executable by a programmed processor within a thermostat for responding to external communications to the thermostat requesting that the thermostat enter into a mode of operation defined by the external communication, said process comprising:

receiving at least one external communication requesting that the thermostat enter into a mode of operation defined by the external communication;

storing information contained within the external communication;

reading a first portion of the stored information containing at least one offset to be used to modify locally entered setpoint temperatures within the thermostat, said process further comprising:

using the read offset to adjust at least one locally entered setpoint temperature to be used by the thermostat in controlling a heating, ventilating and air conditioning system;

periodically sending a message to a display within the thermostat so as to display the mode of operation defined by the external communication;

periodically inquiring as to whether an entry has been made to the thermostat requesting an override of the mode of operation defined by the external communication; and terminating the mode of operation defined by the external communication in response to noting that an entry has been made to the thermostat requesting an override of the mode of operation.

2. The process of claim 1 further comprising:

reading at least a second portion of the stored information containing a time period during which the mode of operation is to occur;

initiating a timer for clocking out the read time period;

periodically reading the timer for clocking out the read time period and determining the amount of time then remaining for the mode of operation defined by the external communication; and sending a message to the display within the thermostat to display the amount of time then remaining in the mode of operation defined by the external communication.

3. The process of claim 2 further comprising the steps of:

sending a message to the display within the thermostat terminating the display of time remaining in the mode of operation defined by the external communication in response to noting that an entry has been made to the thermostat requesting an override of the mode of operation defined by the external communication.

4. The process of claim 1 wherein said step of using the read offset to adjust at least one setpoint temperature to be used by the thermostat in controlling a heating, ventilating and air conditioning system comprises:

periodically checking the locally entered setpoint temperature that is to be presently used by the thermostat when not in the mode of operation defined by the external communication; and periodically adjusting when necessary the locally entered setpoint temperature that is to be presently used by the thermostat.

5. The process of claim 1 wherein the first portion of stored information includes an offset for a locally entered heat setpoint temperature and an offset for a locally entered cool setpoint temperature normally used by the processor in controlling the operation of a heating or cooling system associated with the thermostat, said process further comprising:

reading the offset for locally entered heat setpoint temperature and the offset for the locally entered cool setpoint temperature; and using the read offsets to adjust the locally entered heat and cool setpoints presently used by the thermostat in controlling the operation of the heating or cooling system associated with the thermostat.

6. The process of claim 1 wherein said step of reading at least a first portion of the stored information comprises:

periodically checking as to whether a communication has been received requesting that the thermostat enter into another modification of locally defined setpoints as defined by the then received external communication; and reading at least the first portion of the stored information from the then received external communication; and clearing at least the read first portion of the stored information so as to allow for a subsequent check as to a further receipt of another external communication requesting that the thermostat enter another modification of locally defined setpoints as defined by the further received external communication.

7. A thermostat having the capability to communicate with a hierarchical control system so as to receive a request that the thermostat enter into a mode of operation defined by the external communication, said thermostat comprising:

a temperature sensor;

a memory for storing information;

a processor operative to receive at least one communication from the hierarchical control system requesting that the thermostat enter into a mode of operation defined by the external communication, the information contained in the communication including at least one setpoint offset to setpoint temperature, said processor being operative to store information contained in the communication in said memory, said processor being operative to read a first portion of the stored information containing the at least one communicated setpoint offset, said processor being operative to use the setpoint offset to adjust at least one locally entered setpoint previously stored in said memory, said processor furthermore being operative to note any difference between the temperature of said temperature sensor and the adjusted locally entered setpoint temperature so as to send a control signal to a heating or cooling device.

8. The thermostat of claim 7 wherein said thermostat furthermore comprises a display connected to said processor and wherein said processor is furthermore operative to periodically send a message to said display to indicate that the thermostat is under the control of the hierarchical control system.

9. The thermostat of claim 8 further comprising at least one touch sensitive button which may be depressed when the control by the hierarchical control system is to be overridden wherein said processor is furthermore operative to terminate the adjustments of the locally entered setpoint in response to the touch sensitive button being depressed.

10. The thermostat of claim 7 wherein said processor is furthemore operative to read at least a second portion of information stored in said memory, the second portion containing a time period during which the locally entered setpoint is to be adjusted by the offset, said processor being furthermore operative to initiate a timer for clocking out the time period, said processor being still furthermore operative to periodically read the timer and determine the amount of time then remaining during which the locally entered setpoint is to be adjusted by the offset; said processor thereafter being operative to periodically send a message to said display to display the determined amount of time remaining.

\* \* \* \* \*